(12) United States Patent
Parakulam

(10) Patent No.: US 9,281,535 B2
(45) Date of Patent: Mar. 8, 2016

(54) SYSTEM DONGLE

(75) Inventor: Gopalakrishnan R. Parakulam, Cupertino, CA (US)

(73) Assignee: IMERGY POWER SYSTEMS, INC., Fremont, CA (US)

( * ) Notice: Subject to any disclaimer, the term of this patent is extended or adjusted under 35 U.S.C. 154(b) by 923 days.

(21) Appl. No.: 12/855,059

(22) Filed: Aug. 12, 2010

(65) Prior Publication Data

US 2012/0040216 A1    Feb. 16, 2012

(51) Int. Cl.
| | |
|---|---|
| *H01M 2/36* | (2006.01) |
| *G06F 19/00* | (2011.01) |
| *G05B 15/02* | (2006.01) |
| *H01M 8/18* | (2006.01) |
| *G05B 19/042* | (2006.01) |
| *H01M 8/20* | (2006.01) |
| *H01M 8/04* | (2006.01) |

(52) U.S. Cl.
CPC ............. *H01M 8/188* (2013.01); *G05B 19/042* (2013.01); *H01M 8/20* (2013.01); *H01M 8/04955* (2013.01); *Y02E 60/528* (2013.01)

(58) Field of Classification Search
None
See application file for complete search history.

(56) References Cited

U.S. PATENT DOCUMENTS

| | | | |
|---|---|---|---|
| 3,540,934 A | 11/1970 | Boeke | |
| 3,996,064 A | 12/1976 | Thaller | |
| 4,133,941 A | 1/1979 | Sheibley | |
| 4,159,366 A | 6/1979 | Thaller | |
| 4,309,372 A | 1/1982 | Sheibley | |
| 4,312,735 A | 1/1982 | Grimes et al. | |
| 4,414,090 A | 11/1983 | D'Agostino et al. | |
| 4,454,649 A | 6/1984 | Jalan et al. | |
| 4,468,441 A | 8/1984 | D'Agostino et al. | |
| 4,485,154 A | 11/1984 | Remick et al. | |
| 4,496,637 A | 1/1985 | Shimada et al. | |
| 4,543,302 A | 9/1985 | Gahn et al. | |
| 4,732,827 A | 3/1988 | Kaneko et al. | |
| 4,784,924 A | 11/1988 | Savinell et al. | |
| 4,814,241 A | 3/1989 | Nagashima et al. | |
| 4,828,666 A | 5/1989 | Iizuka et al. | |
| 4,874,483 A | 10/1989 | Wakabayashi et al. | |
| 4,882,241 A | 11/1989 | Heinzel | |
| 4,894,294 A | 1/1990 | Ashizawa et al. | |
| 4,929,325 A | 5/1990 | Bowen et al. | |
| 4,945,019 A | 7/1990 | Bowen et al. | |
| 4,948,681 A | 8/1990 | Zagrodnik et al. | |

(Continued)

FOREIGN PATENT DOCUMENTS

| | | |
|---|---|---|
| DE | 102006007206 | 10/2006 |
| JP | 60047373 | 3/1985 |

(Continued)

OTHER PUBLICATIONS

Office Action for U.S. Appl. No. 12/217,059 mailed Aug. 23, 2010.

(Continued)

*Primary Examiner* — Ula C Ruddock
*Assistant Examiner* — Daniel Gatewood
(74) *Attorney, Agent, or Firm* — Haynes and Boone, LLP

(57) ABSTRACT

A method for operating an electronic system with a dongle is provided. In some embodiments, the method includes receiving system information from system components. The method further comprises continuing or ceasing to operate the electronic system based upon the system information; and writing system information to the dongle.

9 Claims, 9 Drawing Sheets

(56) References Cited

U.S. PATENT DOCUMENTS

| | | |
|---|---|---|
| 4,956,244 A | 9/1990 | Shimizu et al. |
| 5,061,578 A | 10/1991 | Kozuma et al. |
| 5,162,168 A | 11/1992 | Downing et al. |
| 5,188,911 A | 2/1993 | Downing et al. |
| 5,258,241 A | 11/1993 | Ledjeff et al. |
| 5,366,824 A | 11/1994 | Nozaki et al. |
| 5,648,184 A | 7/1997 | Inoue et al. |
| 5,656,390 A | 8/1997 | Kageyama et al. |
| 5,665,212 A | 9/1997 | Zhong et al. |
| 5,759,711 A | 6/1998 | Miyabayashi et al. |
| 5,851,694 A | 12/1998 | Miyabayashi et al. |
| 6,005,183 A | 12/1999 | Akai et al. |
| 6,040,075 A | 3/2000 | Adcock et al. |
| 6,086,643 A | 7/2000 | Clark et al. |
| 6,461,772 B1 | 10/2002 | Miyake et al. |
| 6,475,661 B1 | 11/2002 | Pellegri et al. |
| 6,509,119 B1 | 1/2003 | Kobayashi et al. |
| 6,524,452 B1 | 2/2003 | Clark et al. |
| 6,555,267 B1 | 4/2003 | Broman et al. |
| 6,562,514 B1 | 5/2003 | Kazacos et al. |
| 6,692,862 B1 | 2/2004 | Zocchi |
| 6,759,158 B2 | 7/2004 | Tomazic |
| 6,761,945 B1 | 7/2004 | Adachi et al. |
| 6,764,789 B1 | 7/2004 | Sekiguchi et al. |
| 6,905,797 B2 | 6/2005 | Broman et al. |
| 6,986,966 B2 | 1/2006 | Clarke et al. |
| 7,046,531 B2 | 5/2006 | Zocchi et al. |
| 7,061,205 B2 | 6/2006 | Shigematsu et al. |
| 7,078,123 B2 | 7/2006 | Kazacos et al. |
| 7,181,183 B1 | 2/2007 | Hennessy et al. |
| 7,184,903 B1 | 2/2007 | Williams et al. |
| 7,199,550 B2 | 4/2007 | Tsutsui et al. |
| 7,220,515 B2 | 5/2007 | Ito et al. |
| 7,227,275 B2 | 6/2007 | Hennessy et al. |
| 8,231,993 B2 | 7/2012 | Sahu et al. |
| 2002/0122056 A1* | 9/2002 | Bhesania et al. ............ 345/744 |
| 2003/0008203 A1 | 1/2003 | Winter |
| 2004/0070370 A1 | 4/2004 | Emura |
| 2004/0170893 A1 | 9/2004 | Nakaishi et al. |
| 2004/0202915 A1 | 10/2004 | Nakaishi et al. |
| 2004/0241544 A1 | 12/2004 | Nakaishi et al. |
| 2005/0074653 A1 | 4/2005 | Broman et al. |
| 2005/0156431 A1 | 7/2005 | Hennessy |
| 2005/0156432 A1 | 7/2005 | Hennessy |
| 2005/0158615 A1 | 7/2005 | Samuel et al. |
| 2005/0164075 A1 | 7/2005 | Kumamoto et al. |
| 2005/0181273 A1 | 8/2005 | Deguchi et al. |
| 2005/0260473 A1 | 11/2005 | Wang |
| 2005/0278461 A1 | 12/2005 | Ohta |
| 2006/0014054 A1 | 1/2006 | Sugawara |
| 2006/0092588 A1 | 5/2006 | Realmuto et al. |
| 2007/0072067 A1 | 3/2007 | Symons et al. |
| 2007/0080666 A1 | 4/2007 | Ritter et al. |
| 2007/0111089 A1 | 5/2007 | Swan |
| 2008/0012534 A1* | 1/2008 | Bucur ............ 320/136 |
| 2008/0081247 A1 | 4/2008 | Nakaishi et al. |
| 2008/0193828 A1 | 8/2008 | Sahu |
| 2008/0195768 A1 | 8/2008 | Lowe et al. |
| 2009/0218984 A1 | 9/2009 | Parakulam |
| 2010/0003586 A1 | 1/2010 | Sahu |
| 2010/0090651 A1 | 4/2010 | Sahu |
| 2010/0092757 A1 | 4/2010 | Nair |
| 2010/0092807 A1 | 4/2010 | Sahu |
| 2010/0092813 A1 | 4/2010 | Sahu |
| 2010/0092843 A1 | 4/2010 | Conway |
| 2010/0094468 A1 | 4/2010 | Sahu |
| 2010/0125690 A1 | 5/2010 | Hutton |
| 2010/0136455 A1 | 6/2010 | Winter |
| 2010/0143781 A1 | 6/2010 | Keshavarz |
| 2010/0154014 A1* | 6/2010 | Andersen et al. ............ 725/110 |
| 2010/0261070 A1 | 10/2010 | Keshavarz et al. |
| 2011/0070483 A1 | 3/2011 | Keshavarz et al. |
| 2011/0074357 A1 | 3/2011 | Parakulam et al. |
| 2011/0076526 A1 | 3/2011 | Zu et al. |
| 2011/0079074 A1 | 4/2011 | Sahu |
| 2011/0080143 A1 | 4/2011 | Parakulam et al. |
| 2011/0081561 A1 | 4/2011 | Keshavarz et al. |
| 2011/0081562 A1 | 4/2011 | Parakulam et al. |
| 2011/0086247 A1 | 4/2011 | Keshavarz et al. |

FOREIGN PATENT DOCUMENTS

| | | |
|---|---|---|
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006107988 | 4/2006 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | 9003666 | 4/1990 |
| WO | 0017991 | 3/2000 |
| WO | 03005476 | 1/2003 |
| WO | 2004079849 | 9/2004 |
| WO | 2006135958 | 12/2006 |

OTHER PUBLICATIONS

Search Report for PCT Application No. PCT/US2009/049285.
Office Action for U.S. Appl. No. 12/577,137 mailed Sep. 7, 2010.
International Search Report and Written Opinion dated Dec. 22, 2011 for related PCT application.
International Preliminary Report on Patentability and Written Opinion dated for related International Application No. PCT/US2011/047161, dated Feb. 21, 2013.

* cited by examiner

SYSTEM DONGLE

BACKGROUND OF THE INVENTION

1. Field of the Invention

Embodiments disclosed herein generally relate to control systems, and more specifically, to a control system for a flow cell battery.

2. Description of the Relevant Art

There is an increasing demand for novel and innovative electric power storage systems. Redox flow cell batteries have become an attractive means for such energy storage. In certain applications, a redox flow cell battery may include one or more redox flow cells. Each of the redox flow cells may include positive and negative electrodes disposed in separate half-cell compartments. The two half-cells may be separated by a porous or ion-selective membrane, through which ions are transferred during a redox reaction. Electrolytes (anolyte and catholyte) are flowed through the half-cells as the redox reaction occurs, often with an external pumping system. In this manner, the membrane in a redox flow cell battery operates in an aqueous electrolyte environment. In some applications, an iron-ion containing aqueous hydrochloric acid solution may be used as the catholyte, while a chromium-ion containing aqueous hydrochloric acid solution may be used as the anolyte. In some applications, a mixture of chromium and iron containing solutions may be used on both sides of the redox cell. The use of mixed reactants eliminates the requirement for a highly-selective membrane since the electrolyte composition of both half cells is identical in the discharged state.

In order to provide a consistent supply of energy, it is important that many of the components of the redox flow cell battery system are performing properly. Redox flow cell battery performance, for example, may change based on parameters such as the state of charge, temperature, electrolyte level, concentration of electrolyte and fault conditions such as leaks, pump problems, and power supply failure for powering electronics. To be useful as an electric power storage system, it is desirable that the redox flow cell battery system requires a minimal amount of maintenance and monitoring. Therefore, there is a need for efficient control systems for identifying, controlling, and monitoring a redox flow cell battery system.

SUMMARY OF THE INVENTION

Embodiments of the present invention provide a method and apparatus for operating an electronic system with a dongle. The method involves receiving system information from system components; continuing or ceasing to operate the electronic system based upon the system information; and writing system information into a dongle.

These and other embodiments of the invention are further described below with respect to the following figures.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
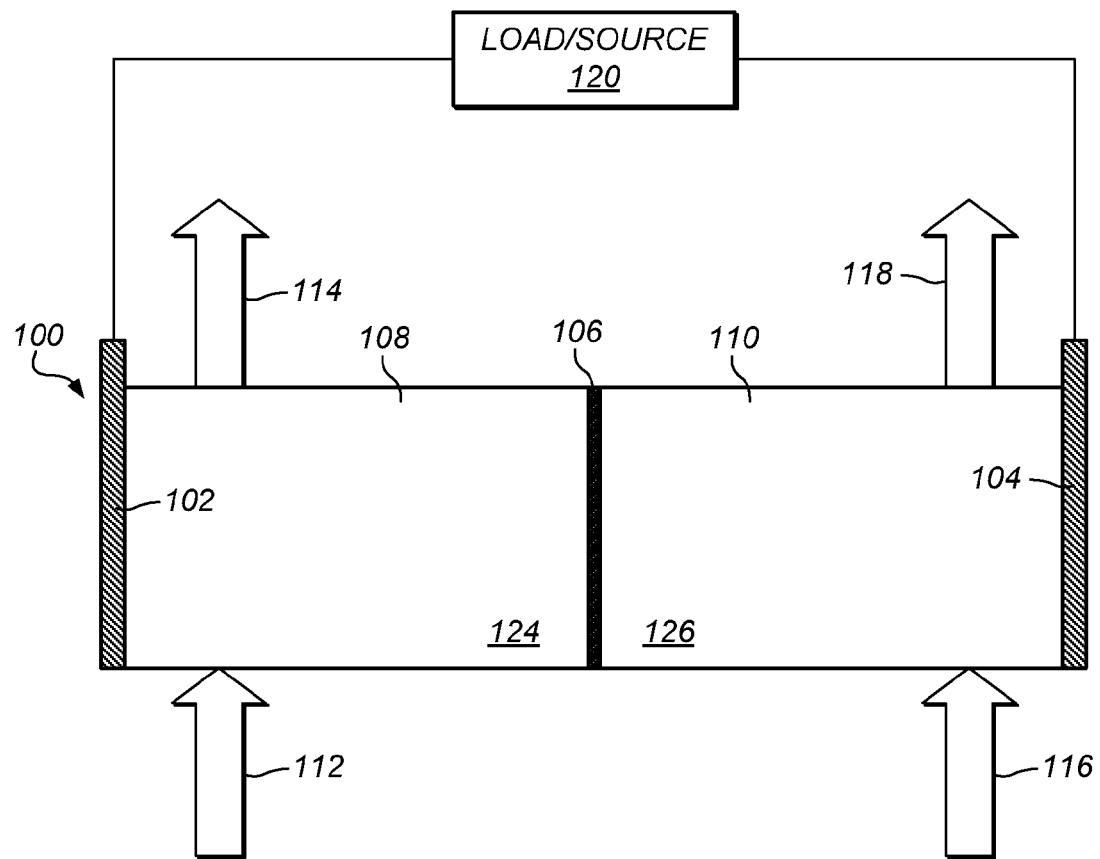
FIG. 1 depicts a redox flow cell filled with electrolyte.

Where possible in the figures, elements having the same function have the same designation.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

As used in the present specification, the following words and phrases are generally intended to have the meanings as set forth below, except to the extent that the context in which they are used indicates otherwise.

As described herein, the term "cell" refers generally to any unit capable of performing electrochemical energy conversion. Exemplary cells include, but are not limited to, redox flow batteries, fuel cells, and secondary batteries.

As described herein, the term "membrane" refers to any material that forms a barrier between fluids, for example between electrochemical half-cells (e.g., an anode compartment and a cathode compartment). Exemplary membranes may be selectively permeable, and may include porous membranes and ion-selective membranes. Exemplary membranes may include one or more layers, wherein each layer exhibits a selective permeability for certain species (e.g., ions), and/or effects the passage of certain species.

As described herein, the term "fluid communication" refers to structures which are in contact with, but not necessarily affixed to, one another, whereby a fluid or gas can pass from one structure to the other. For example, two structures may be in fluid communication with one another by a channel, conduit, opening, and/or valve, even if the communication includes a valve in a closed state but provided that the valve may be opened, whereby a fluid or gas may be moved from one of the structures to the other. In addition, two structures may be considered to be in fluid communication with each other even in circumstances where one or more intermediate structures divert and/or interrupt the flow of the fluid or gas from the first structure to the second structure, so long as flow of the fluid or gas from the one or more intermediate structures to the second structure is ultimately possible.

As described herein, the "chromium side" of a cell refers generally to the negative side of a Cr/Fe based redox flow cell. In some embodiments, the oxidation of chromium occurs at the chromium side of the cell.

As described herein, the "iron side" of a cell refers generally to the positive side of a Cr/Fe based redox flow cell. In some embodiments, the reduction of iron occurs at the iron side of the cell.

FIG. 1 illustrates a schematic drawing of a simplified redox flow cell battery system 100. As shown, redox flow cell system includes redox flow cell 100, which includes two half-cells 108 and 110 separated by a membrane 106. An electrolyte 124 is flowed through half-cell 108 and an electrolyte 126 is flowed through half-cell 110. Half-cells 108 and 110 include electrodes 102 and 104, respectively, in contact with electrolytes 124 and 126, respectively, such that redox reactions occur at the surface of the electrodes 102 or 104. In some embodiments, multiple redox flow cells 100 may be electrically coupled (e.g., stacked) either in series to achieve higher voltage or in parallel in order to achieve higher current. The stacked cells are collectively referred to as a battery stack and flow cell battery can refer to a single cell or battery stack. As shown in FIG. 1, electrodes 102 and 104 are coupled across load/source 120, through which electrolytes 124 and 126 are either charged or discharged.

When filled with electrolyte, half-cell 110 of redox flow cell 100 contains anolyte 126 and the other half-cell 108 contains catholyte 124, the anolyte and catholyte being collectively referred to as electrolytes. Reactant electrolytes may be stored in separate reservoirs and dispensed into half-cells 108 and 110 via conduits coupled to cell inlet/outlet (I/O) ports 112, 114 and 116, 118 respectively. In some embodiments, an external pumping system is used to transport the electrolytes to and from the redox flow cell. Electrolyte 124 flows into half-cell 108 through inlet port 112 and out through outlet port 114, while electrolyte 126 flows into half-cell 110 through inlet port 116 and out of half-cell 110 through outlet port 118.

At least one electrode 102 and 104 in each half-cell 108 and 110 provides a surface on which the redox reaction takes place and from which charge is transferred. Suitable materials for preparing electrodes 102 and 104 generally include those known to persons of ordinary skill in the art. Redox flow cell 100 operates by changing the oxidation state of its constituents during charging or discharging. The two half-cells 108 and 110 are connected in series by the conductive electrolytes, one for anodic reaction and the other for cathodic reaction. In operation (e.g., during charge or discharge), electrolytes 126 and 124 are flowed through half-cells 108 and 110 through I/O ports 112, 114 and 116, 118 respectively as the redox reaction takes place.

Positive ions or negative ions pass through permeable membrane 106, which separates the two half-cells 108 and 110, as the redox flow cell 100 charges or discharges. Reactant electrolytes are flowed through half-cells 108 and 110, as necessary, in a controlled manner to supply electrical power or be charged by load/source 120. Suitable membrane materials for membrane 106 include, but are not limited to, materials that absorb moisture and expand when placed in an aqueous environment. In some embodiments, membrane 106 may comprise sheets of woven or non-woven plastic with active ion exchange materials such as resins or functionalities embedded either in a heterogeneous (such as co-extrusion) or homogeneous (such as radiation grafting) way. In some embodiments, membrane 106 may be a porous membrane having high voltaic efficiency Ev and high coulombic efficiency and may be designed to limit mass transfer through the membrane to a minimum while still facilitating ionic transfer. In some embodiments, membrane 106 may be made from a polyolefin material and may have a specified thickness and pore diameter. A manufacturer having the capability to manufacture these membranes, and other membranes consistent with embodiments disclosed, is Daramic Microporous Products, L.P., N. Community House Rd., Suite 35, Charlotte, N.C. 28277. In certain embodiments, membrane 106 may be a nonselective microporous plastic separator also manufactured by Daramic Microporous Products L.P. A flow cell formed from such a membrane is disclosed in U.S. Published Patent App. No. 2010/0003586, filed on Jul. 1, 2008, which is incorporated herein by reference.

In some embodiments, multiple redox flow cells may be stacked to form a redox flow cell battery system. Construction of a flow cell stack battery system is described in U.S. patent application Ser. No. 12/577,134, entitled "Common Module Stack Component Design" filed on Oct. 9, 2009, which is incorporated herein by reference.

In some embodiments of redox flow cell 100 in FIG. 1, electrolyte 124 includes an aqueous acid solution. In some embodiments, the acidic solution includes aqueous hydrochloric acid. Electrolyte 124 further includes at least one metal salt (e.g., a metal chloride salt). In some embodiments, electrolyte 126 comprises an aqueous acid solution. In some embodiments, the acidic solution includes aqueous hydrochloric acid. Electrolyte 126 further includes at least one metal salt (e.g., a metal chloride salt).

In one embodiment, a redox flow cell battery system is based on a Cr/Fe redox pair. The remainder of the description will be based on a Cr/Fe redox flow cell battery, however, it should be understood that the concepts described herein may also be applied to other metals. In an embodiment of a Cr/Fe redox flow cell battery, both electrolytes 124 and 126 include a solution of $FeCl_2$ and $CrCl_3$ in aqueous HCl.

Figure 2:
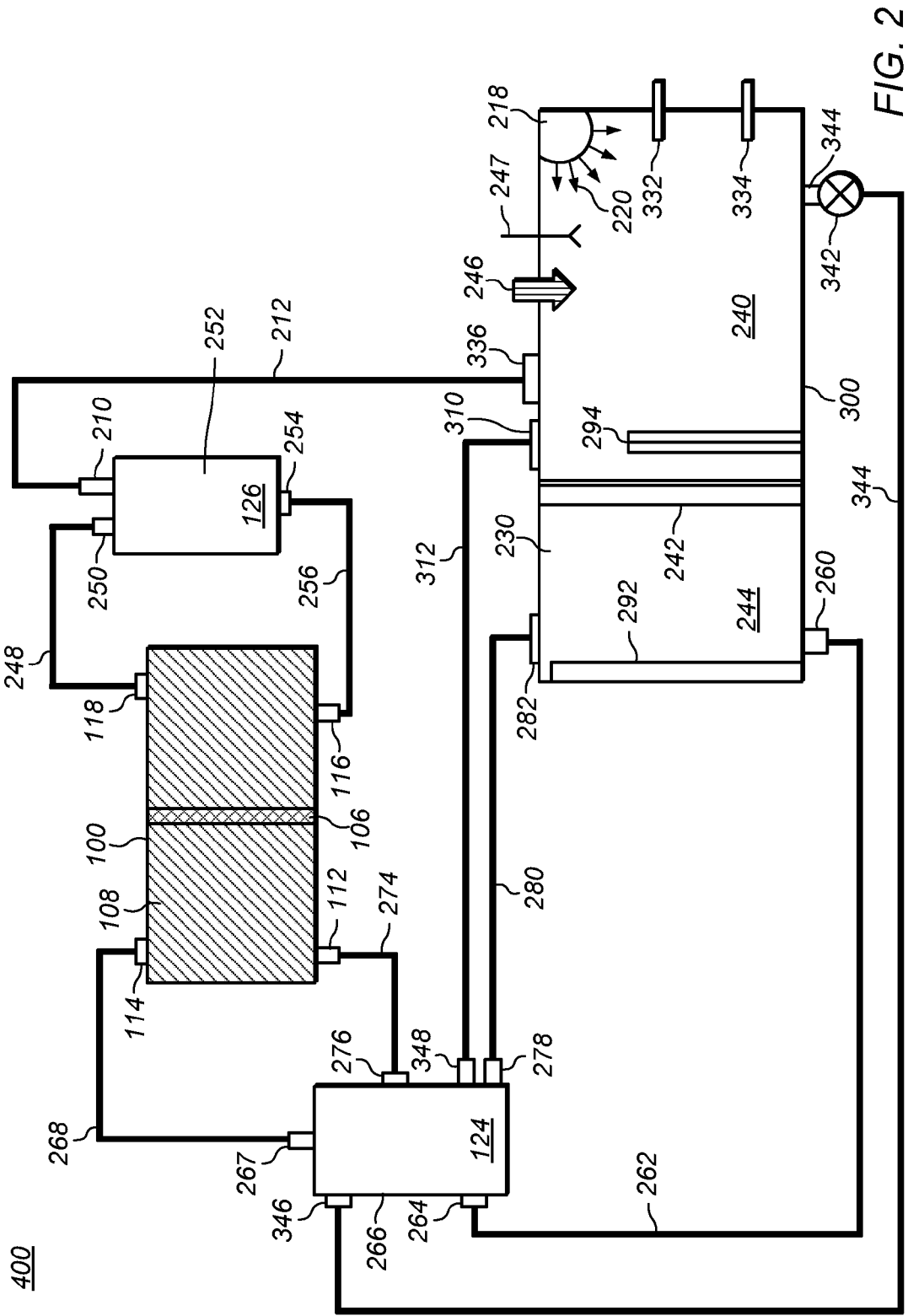
FIG. 2 depicts a redox cell coupled to a rebalancing system.

FIG. 2 illustrates a redox flow cell battery system 400 that includes redox flow cell 100 coupled to rebalancing cell 300. For convenience only, redox flow cell 100 is illustrated with a single cell that includes half-cell compartment 108 and half-cell compartment 110 separated by membrane 106. $H_2$ produced in compartment 110 may be transferred from redox cell 100 through conduit 248 and into reservoir 252 through inlet 250, which also contains electrolyte 126. From there, $H_2$ may be vented from outlet 210 and carried along conduit 212 and into anode compartment 240 of rebalance cell 300 via inlet 336. Rebalance cell 300 also houses cathode compartment 244. Anode compartment 240 and cathode compartment 244 are separated by porous membrane 242. Cathode compartment 244 contains cathode 292, while anode compartment 240 contains anode 294.

When electrolyte in anode compartment 240 comprises aqueous HCl, the process of oxidation will effect the formation of $Cl_2$ at anode 294, which then collects at the top of anode compartment 240. $H_2$ introduced through inlet 336 also collects at the top of anode compartment 240. Anode compartment 240 includes ultraviolet source 218, which may be used to expose the $H_2$ and $Cl_2$ to ultraviolet radiation 220. Ultraviolet source 218 may be encapsulated by a shell to protect it from exposure to substances (e.g., $Cl_2$ and $H_2$) within anode compartment 240. As noted previously, the exposure of $H_2$ and $Cl_2$ to ultraviolet radiation 220 effects the formation of HCl, which then dissociates in the aqueous catholyte as $H^+$ and $Cl^-$. The heat and pressure resulting from the operation of ultraviolet source 218 may be closely monitored by sensors 246. $H_2$ and $Cl_2$ concentrations may be monitored through gas sensor 247.

Permeable membrane 242 may allow for the passage of $H^+$ into cathode compartment 244 and the aqueous electrolyte contained therein. This passage typically results in a drop in the electrolyte volume in anode compartment 240. As described previously, the level of electrolyte in anode compartment 240 is controlled to be between lower sensor 334 and upper sensor 332. In some embodiments, a drop in electrolyte level detected by lower sensor 334 will stop the flow of power and effect the draining of electrolyte through outlet 340 and valve 342. From there, the electrolyte may be transported along conduit 344 and into reservoir 266 via inlet 346. Electrolyte may then be flowed from outlet 348 and along conduit 312 to refill anode compartment 240 via inlet 310. In some embodiments, valve 342 may remain open for some period of time after electrolyte begins to fill anode compartment 240 in order to flush compartment 240. Once anode compartment 240 is refilled, power is once again applied to electrodes 294 and 292 to begin production of chlorine gas.

In some embodiments, the refilling of anode compartment 240 may be accomplished by a second arm off of conduit 274. For example, in some embodiments, redox flow cell battery system 400 may lack conduit 312. Thus, in some embodiments, a second arm off of conduit 274 (not shown) may be implemented to affect the transfer of electrolyte to anode compartment 240 via inlet 310 for refilling. In some embodiments, valve(s) may be implemented to control the fill.

Passage of $H^+$ into cathode compartment 244 will result in a rise in the level of the electrolyte and $H^+$ present therein. Restoration of the appropriate electrolyte level may be achieved by draining a volume of the electrolyte through conduit 262 via outlet 260. The electrolyte is transported along conduit 262 and into reservoir 266 via inlet 264. There, the electrolyte may be equilibrated and again dispelled via outlet 278. Equilibrated electrolyte from reservoir 266 may be used to replace the electrolyte drained from cathode compartment 244 through conduit 280 and inlet 282.

Alternatively, in some embodiments, electrolyte from cathode compartment 244 may be placed in fluid communication with reservoir 266 by other means. For example, in some embodiments, redox flow cell battery system 400 may lack conduit 262. Thus, in some embodiments, a second arm off of conduit 274 may be implemented to affect the transfer of electrolyte from cathode compartment 244 to reservoir 266. In some embodiments, valve(s) may be implemented to control the transfer.

Electrolyte in half-cell compartment 108 of redox flow cell 100 may be drained through outlet 112 and replenished in reservoir 266 via conduit 274 and inlet 276. Replenished electrolyte 124 exits reservoir 266 though outlet 267, which is then transported through conduit 268 and reintroduced into half-cell compartment 108 via inlet 114. Similarly, reservoir 252 feeds electrolyte 126 from outlet 250 into half-cell compartment 110 via conduit 248 and inlet 118. Once depleted, the electrolyte may be drained from half-cell compartment 110 through outlet 116 and transported along conduit 256 for reintroduction into reservoir 252 via inlet 254.

Alternative I/O port and conduit placements will be obvious to persons of ordinary skill in the art. For example, in some embodiments, inlet 346 may be placed at the top of reservoir 266, instead of the side as depicted in FIG. 2. Other rearrangements to I/O port and conduit placements depicted in FIG. 2 are obvious and have the ability to effect similar results.

Further descriptions of details of redox flow cell battery systems can be found in the following U.S. Patent Applications, all of which are incorporated herein by reference: U.S. patent application Ser. No. 11/674,101, entitled "Apparatus and Methods of Determination of State of Charge in a Redox Flow Battery", filed on Feb. 12, 2007; U.S. application Ser. No. 12/074,110, entitled "Battery Charger", filed on Feb. 28, 2008; U.S. patent application Ser. No. 12/217,059, entitled "Redox Flow Cell," filed on Jul. 1, 2008; U.S. patent application Ser. No. 12/576,235, entitled "Magnetic Current Collector" filed on Oct. 8, 2009; U.S. patent application Ser. No. 12/576,240, entitled "Venturi Pumping System in a Hydrogen Gas Circulation of a Flow Battery" filed on Oct. 8, 2009; U.S. patent application Ser. No. 12/576,242, entitled "Method and Apparatus for Determining State of Charge of a Battery" filed on Oct. 9, 2009; U.S. patent application Ser. No. 12/577,124, entitled "Flexible Multi-Walled Tubing Assembly" filed on Oct. 9, 2009; U.S. patent application Ser. No. 12/577,127, entitled "Thermal Control of a Flow Cell Battery" filed on Oct. 9, 2009; U.S. patent application Ser. No. 12/577,131, entitled "Methods for Bonding Porous Flexible Membranes Using Solvent" filed on Oct. 9, 2009; U.S. patent application Ser. No. 12/577,134, entitled "Common Module Stack Component Design" filed on Oct. 9, 2009; U.S. patent application Ser. No. 12/577,147, entitled "Level Sensor for Conductive Liquids" filed on Oct. 9, 2009; U.S. patent application Ser. No. 12/631,749, entitled "Methods for the Preparation and Purification of Electrolytes for Redox Flow Batteries" filed on Dec. 4, 2009; U.S. patent application Ser. No. 12/721,411, entitled "Methods for the Preparation of Electrolytes for Chromium-Iron Redox Flow Batteries" filed on Mar. 10, 2010; U.S. patent application Ser. No. 12/790,793 entitled "Control System for a Flow Cell Battery", filed May 28, 2010; U.S. patent application Ser. No. 12/790,595 entitled "Preparation of Redox Flow Battery Electrolytes from Raw Materials", filed May 28, 2010; U.S. patent application Ser. No. 12/790,601 entitled "Electrolyte Compositions", filed May 28, 2010; U.S. patent application Ser. No. 12/790,794 entitled "Hydrogen Chlorine Level Detector", filed May 28, 2010; U.S. patent application Ser. No. 12/790,749 entitled "Optical Leak Detection Sensor", filed May 28, 2010; U.S. patent application Ser. No. 12/790,783 entitled "Buck-Boost Control Circuit", filed May 28, 2010; U.S. patent application Ser. No. 12/790,753 entitled "Flow Cell Rebalancing", filed May 28, 2010; and U.S. patent application Ser. No. 12/790,613 entitled "Methods of Producing Hydrochloric Acid from Hydrogen Gas and Chlorine Gas", filed May 28, 2010.

Figure 3:
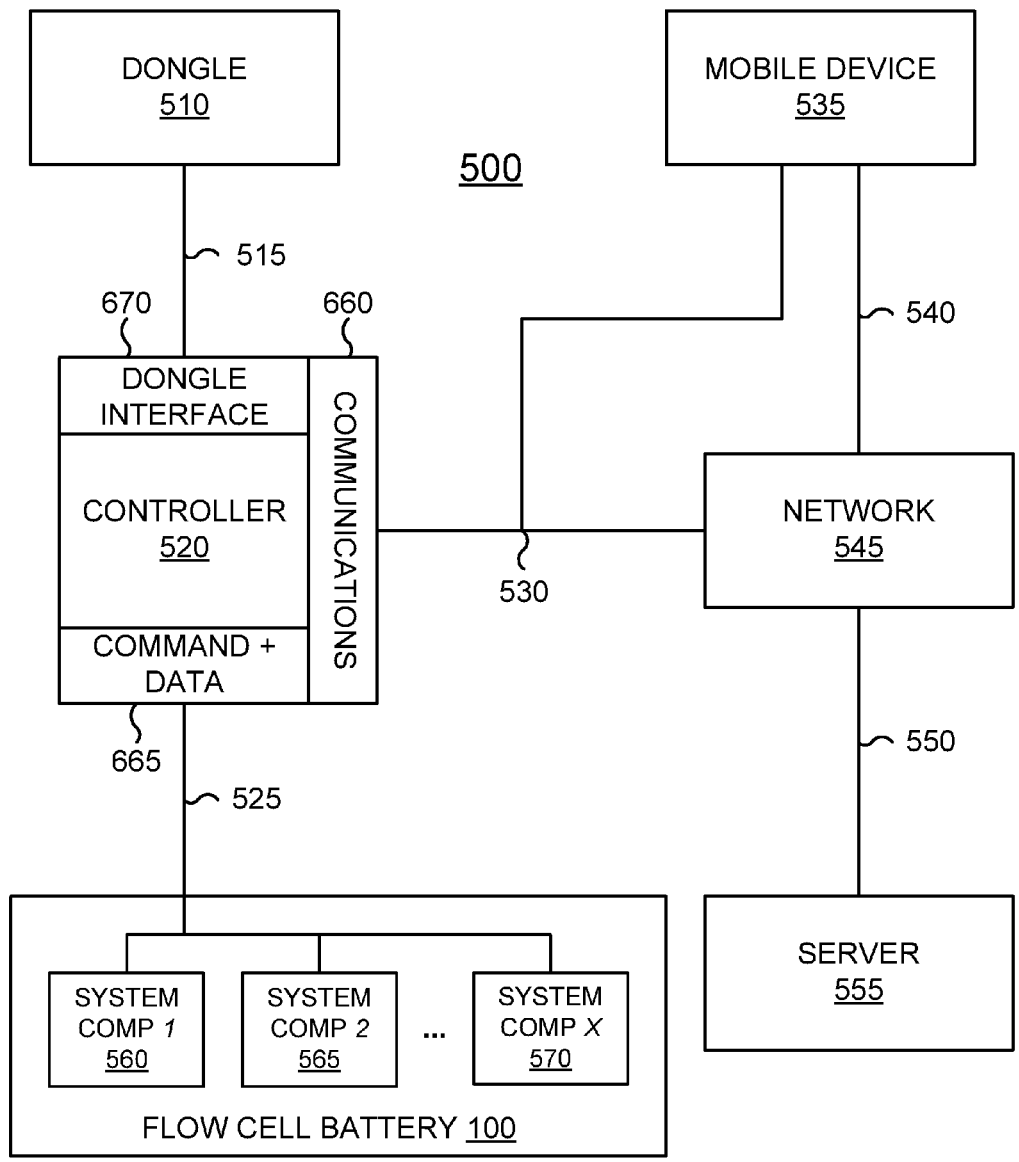
FIG. 3 is a simplified block diagram of a flow cell battery system consistent with embodiments of the present invention.

FIG. 3 illustrates a block diagram of redox flow cell battery system 500. As shown in FIG. 3, system components 560-570 in redox flow cell battery 100 send data to and receive control signals from controller 520 through command and data interface 665 and first link 525. System components may, for example, be redox flow cell battery stacks, valves, pumps, sensors, control and power subsystems, and the like. First link 525 may, for example, be wire (e.g., stranded or solid copper), coaxial cable, optical fiber, and the like. First link 525 may optionally be configured as one or more parallel and/or serial busses.

Figure 4:
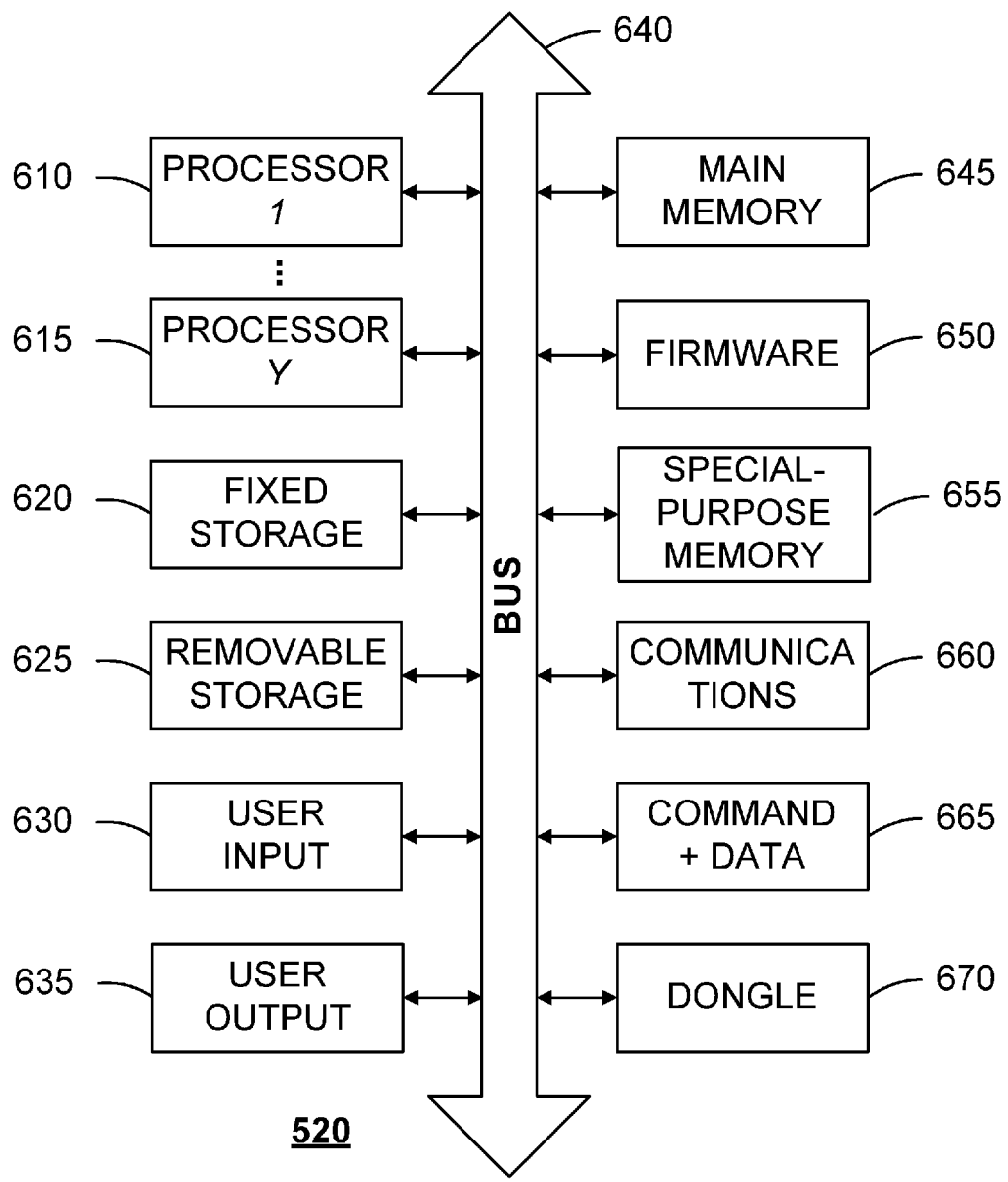
FIG. 4 is a simplified block diagram of the controller of FIG. 3.

FIG. 4 is a simplified block diagram of controller 520 according to embodiments of the present invention. Controller 220 may include one or more processors 610-615. The one or more processors 610 - 615 may be microcontrollers, microprocessors, digital signal processors, etc. (e.g., Microchip PIC, ARM, Intel x86, Power ISA, Texas Instruments OMAP, etc.). Fixed storage 620 may be a magnetic hard disk, solid state hard disk, PROM, EPROM, EEPROM, FLASH, magnetoresistive RAM (MRAM), and other non-removable storage. Removable storage 625 may be tape, floppy disk, USB flash drive, CD-ROM, DVD, Blu-ray Disc, and other removable media.

User input 630 may be keyboards, keypads, mice, touchpads, digitizing tablets, trackballs, game controllers (e.g., joystick, game pad, steering wheel, pedals, yoke, dance pad, etc.), fingerprint reader, barcode scanner, and other user input device. User output 635 may be a display screen or monitor, indicator lights, speaker, headphones, bell, buzzer, etc. User output 635 may include graphics processing units, sounds chips, etc.

Main memory 645 may be volatile static and/or dynamic random-access memory (e.g., SRAM, FPM, EDO, Synchronous SDRAM, DDR SDRAM, DDR2 SDRAM, DDR3 SDRAM, etc.), nonvolatile memory (e.g., EPROM, EEPROM, Flash, etc.), and based upon technologies such as silicon chip and carbon nanotubes. Firmware 650 may be content such as programs and data to enable the operation of controller 520. In some embodiments, firmware 650 may be stored in read-only non-volatile memory (e.g., PROM, EPROM, EEPROM, FLASH, etc.). Special purpose memory 655 may be of technology similar to main memory and may be used for caches, shadow memory, graphics, etc. (e.g., GDDR).

Communications interface 660 may, for example, be one or more interfaces to any wired or wireless communications between computers or devices, such as Ethernet, wireless LAN, terrestrial microwave, communications satellites, cellular and PCS systems, and smart grid. In some embodiments of the present invention, communications interface 660 may be a modem. Command and data interface 665 may, for example, be one or more interfaces for sending instructions or other control signals to other parts of a redox flow cell battery system, such as pumps, valves, heaters, coolers, power supplies, etc. Command and data interface 665 may, for example, be one or more interfaces for receiving data from other parts of a redox flow cell battery system, such as sensors for gas concentrations, temperature, pressure, fluid level, voltage, etc.

Controller components 610-670 are interconnected by bus 640. Bus 640 may be a single bus, or be two or more individual busses which interconnect subsets of the controller components. Bus 640 may be parallel or serial, of any topology, and use any protocol. Bus 640 may, for example, be at least one of inter-integrated circuit (PC) bus, universal serial bus (USB), SPI, RS-232, CANBUS, ISA, VMEbus, PCI, PCI-X, etc. Controller components 610-670 may, for example, be on a single printed circuit board with bus 640, or on two or more printed circuit boards connected by bus 640 (i.e., bus(ses) on and interconnecting the printed circuit boards).

Referring back to FIG. 3, controller 520 communicates with dongle 510 through dongle interface 670 and second link 515. Dongle 510 may, for example, be comprised of FLASH memory, electrically erasable programmable read-only memory (EEPROM), magnetoresistive RAM (MRAM), optical disc, and the like. Second link 515 may, for example, be a parallel or serial bus (e.g., $I^2C$, USB, SPI, RS-232, CANBUS, and the like).

Information transferred between controller 520 and dongle 510 may be encrypted. Referring back to FIG. 4, in some embodiments processor(s) 610-615 may encrypt data written to dongle 510 and decrypt data read from dongle 510. In some embodiments, dongle 510 includes electronics for encryption and decryption, and encrypts data written by processor(s) 610-615 and decrypts data read by processor(s) 610-615. The encryption method may, for example, be AES, Blowfish, DES, Triple DES, Serpent, Twofish, and the like. Encryption key(s) may be stored in at least one of main memory 645, firmware 650, and fixed storage 620.

Referring back to FIG. 3, controller 520 may also communicate with network 545 through communications interface 660 and third link 530. Communications interface 660 may, for example, be an Ethernet interface, modem, and the like. Network 545 may use physical connections (e.g., Category 6 cable, twisted pair wire, coaxial cable, fiber optic cable, and the like), and radio waves or infrared signals (e.g., terrestrial microwave, communications satellites, cellular and PCS systems, wireless local area networks (WLANs), and the like). Network 545 may use one or more communications protocol (e.g., Ethernet (i.e., IEEE 802.3), GPRS, GSM, CDMA, and the like). Third link 530 may be a parallel or serial bus (e.g., inter-integrated circuit (PC) bus, universal serial bus (USB), SPI, RS-232, CANBUS, and the like.

A mobile device 535 may connect to controller 520 through third link 530 and/or through the communications network 545. Mobile device 535 may, for example, be a notebook computer, laptop computer, rugged (or ruggedized) laptop, ultraportable computer, netbook computer, tablet computer, smartphone, PDA, and the like. In some embodiments of the present invention, mobile device 535 is a notebook computer. Mobile device 535 may include input and output devices (e.g., LCD display, keyboard, mouse, touchpad, etc.) to interface with a user, nonvolatile memory (e.g., FLASH memory, EEPROM, MRAM, hard disk drive, optical disc, etc.), and transceiver to communicate with the controller 520 over third link 530 and/or communications network 545 over fourth link 540. Fourth link 540 may be at least one of a physical connection (e.g., Category 6 cable, twisted pair wire, coaxial cable, fiber optic cable, and the like), radio waves, and infrared signals (e.g., terrestrial microwave, communications satellites, cellular and PCS systems, wireless local area networks (WLANs), and the like).

Server 555 may be connected to the communications network 545 through fifth link 550. Fifth link 550 may be wired and/or wireless connections (e.g., Category 6 cable, twisted pair wire, coaxial cable, fiber optic cable, terrestrial microwave, communications satellites, cellular and PCS systems, WLANs, etc.). Server 555 may include one or more processors, one or more workstations, storage (e.g., RAM, nonvolatile memory, hard disk drive, optical disc, etc.), input devices (e.g., mouse, keyboard, trackball, etc.), system bus(ses) to interconnect the above components, and the like. Certain embodiments of server 555 include a transceiver (e.g., Ethernet interface, modem, etc.) for communication through fifth link 550. Server 555 can be at least one of a data server or a Short Message Service (SMS) server.

System Information and Ebox Information may be can be sent on second link 525 by system components 560-570 and received by controller 520. The term "Ebox," as used herein, is an assembly containing printed circuit boards, circuits, and components which perform processor functions to control the system and power functions to deliver power to and from the system. In some embodiments, Ebox Information 710 can be the number of times an Ebox has been changed in flow cell battery system 100, firmware version numbers, and serial numbers of printed circuit boards. In some embodiments, System Information 730 can be serial numbers of the redox flow battery's enclosure, redox flow battery, rebalance cell, panel, pumps, sensors, etc. System Information and Ebox Information may, for example, be sent as a result of a "soft" reset (i.e., restarting system without removing power), "hard" reset (i.e., restarting system after power removed), and/or in response to signals sent by controller 520.

Controller 520 may operate redox flow cell battery system 100 based upon System Information and Ebox Information. Controller 520 may also continue or cease operation of redox flow cell battery system 100 based upon System Information and Ebox Information. For example, controller 520 may, from System Information and Ebox Information, determine the presence or absence of system components 560-570 and determine whether to cease operation of redox flow cell battery system 100. In some embodiments, when dongle 510, or one or more critical components of system component 560-570 are absent, controller 520 may stop operation of redox flow cell battery system 100.

Controller 520 may configure redox flow cell battery system 100 based upon System Information and Ebox Information. In some embodiments, controller 520 may use System Information and Ebox Information to determine the characteristics (e.g., pump speed, power capacity, response time, power consumption, and the like) of system components 560-570 and configure and/or operate redox flow cell battery system 100 to optimize efficiency or performance. For example, slower/lower capacity pumps can be operated longer than faster/higher capacity pumps; sensor measurements may be analyzed more frequently depending upon how frequently the sensors take measurements and the granularity of those measurements; and depending upon the type of electrolyte used in the system (e.g., as identified to a commissioning program running on mobile device 535 which initializes system 500 when the system is installed) different state of charge (SOC) tables can be used.

Controller 520 may store System Information and Ebox Information in dongle 510. Dongle 510 may be attached to redox flow battery system 100 and not be subject to failure and replacement like system components 560-570. Dongle 510 may store several sets of System Information and Ebox Information and serve as a "local" (i.e., stored in redox flow battery system 100) history or maintenance record. Dongle 510 may optionally store date and time information (e.g., from controller's 520 clock) along with System Information and Ebox Information. For example, when a first of system component 560-570 is replaced by a second of system component 560-570, the date and time associated with the second system component indicates when the second system component replaced the first system component.

Controller 520 may calculate System Parameters using sensor measurements. In some embodiments, System Parameters can be redox flow battery's 100 equivalent series resistance (ESR) (which can be computed during a battery charging cycle), information concerning SOC, and information concerning imbalances among half cells. For example, sensor measurements (e.g., voltage and current data) can be used to calculate the redox flow battery's 100 ESR. ESR data can be stored every battery charge-discharge cycle. A gradual performance reduction can be determined from the ESR data, and a gradual reduction in capacity is proportional to a charge imbalance between half cells. Controller 520 can store System Parameters in dongle 510.

Controller 520 may communicate over network 545. Controller 520 can receive Communication System Information. Communication System Information can be used to identify redox flow battery system 100 and to enable communication between redox flow battery system 100 and server 555. For example, Communication System Information can be a dongle serial number (or other identification), redox flow battery system identification (or other identification), and contact information (e.g., IP address, port number, access point name (APN), telephone number, username, password, etc.), and the like. In some embodiments, dongle 510 receives a set of Communication System Information before it is installed in redox flow battery system 100, and controller 520 reads Communication System Information from dongle 510. In some embodiments, controller receives Communication System Information from a commissioning program through mobile device 535 and optionally stores Communication System Information in dongle 510. Using Communication System Information, controller 520 can communicate over network 545 with server 555. Server 555 can receive System Information and Ebox Information and/or Communication System Information, and if needed send updated Communication System Information to controller 520. Controller 520 can store new Communication System Information in dongle 510. Likewise, controller 520 can send system parameters through network 545 to server 555. Information stored in dongle 510 can be read by controller 520 and sent to mobile device 535 and/or server 555.

Figure 5:
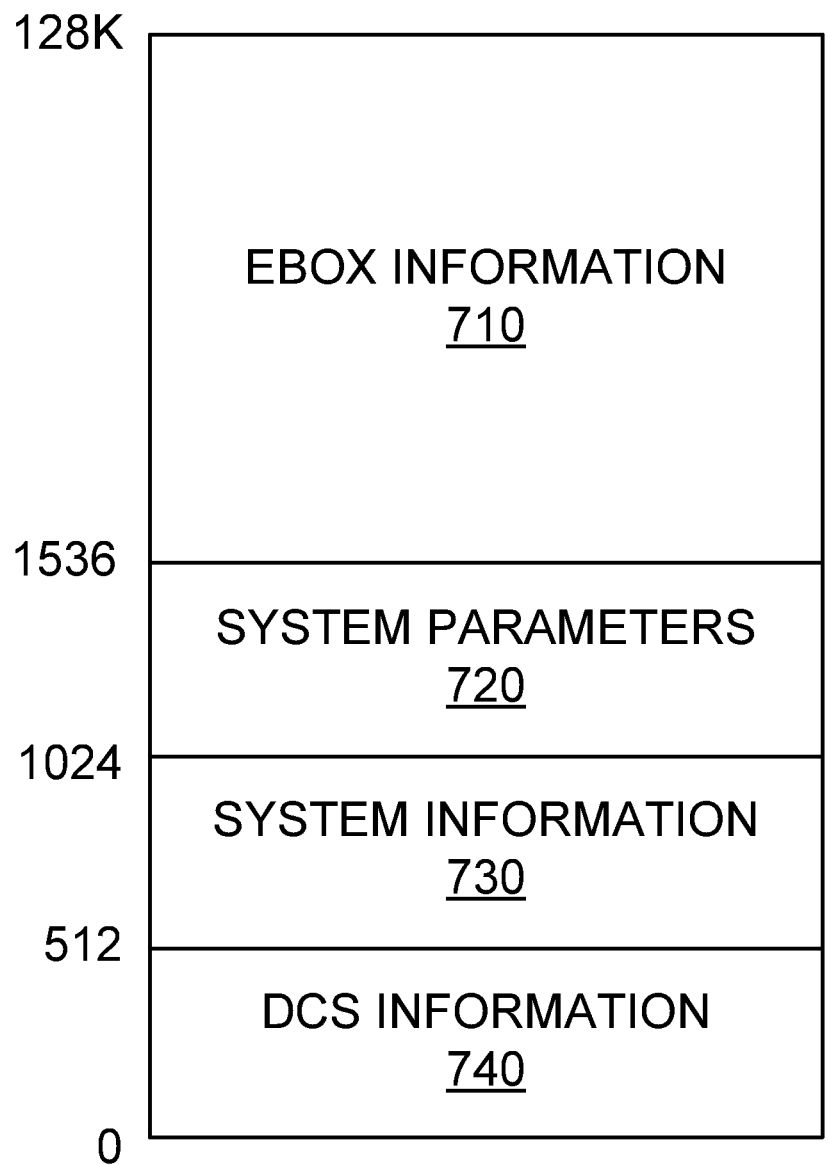
FIG. 5 illustrates a memory map according to some embodiments of the present invention.

FIG. 5 is a memory map 700 of dongle 510. Dongle 510 may, for example, store Ebox Information 710, System Parameters 720, System Information 730, and Communication System Information 740.

As can be readily appreciated by one of ordinary skill in the art, dongle 510 may store other types of information and be used in other types of mechanical, electrical, and/or chemical systems, for example, identification of system components (e.g., serial numbers, addresses, version numbers, radio-frequency identification (RFID), service-subscriber key (IMSI), and the like), location information (e.g., global positioning system (GPS) coordinates, location area identity (LAI), and the like), and operating information (e.g., statistics, operating life (time), warnings or errors, and the like.

Referring to FIG. 5, dongle 510 may have a 128K word memory space. For example, addresses 0x0000-0x01FF may store Communication System Information 740; addresses 0x0200-0x03FF may store System Information 730; addresses 0x0400-0x05FF may store System Parameters 720; and addresses 0x600-0x2000 may store Ebox Information 710. In some embodiments, the word width is 1 byte.

The following listings illustrate embodiments of possible contents of the Ebox Information 710, System Parameters 720, System Information 730, and Communication System Information 740, and their respective sizes. As one of ordinary skill in the art may readily appreciate, larger or smaller memory spaces, different data widths, different data types, memory allocation, etc. may be used for dongle 510.

Communication System Information (740)
    Dongle ID:
    SysID:
    Communication System Server1: IP: Port:
    Communication System Server2: IP: Port2:
    Communication System Phone1:
    Communication System Phone2:
    APN: UserName: Password:
    GeoID:

Ebox Information (710)
    No. of Ebox changes:
    Ebox Change #: 0
    BuckBoostRev: 00
    BuckBoost1#: 00
    BuckBoost2#: 00
    BuckBoost3#: 00
    Control Board #: 00
    Control Board Rev: 00
    Buck Boost Rev1: 00
    Buck Boost Rev2: 00
    Buck Boost Rev3: 00
    Date: 00

Firmware Version:
  Control Board: 00
  RBC Board: 00
  DMS Board: 00
System Parameters (720)
  ESR Values, 35
System Information (730)
  BoP Enclosure #: 00
  Stack Serial #: 00
  RBC Serial #: 00
  Black Box Serial #: 00
  Patch Panel Serial #: 00
  Pump Left Serial #: 00
  Pump Right Serial #: 00
  Level Sensor Left Serial #: 00
  Level Sensor Right Serial #: 00

Figure 6:
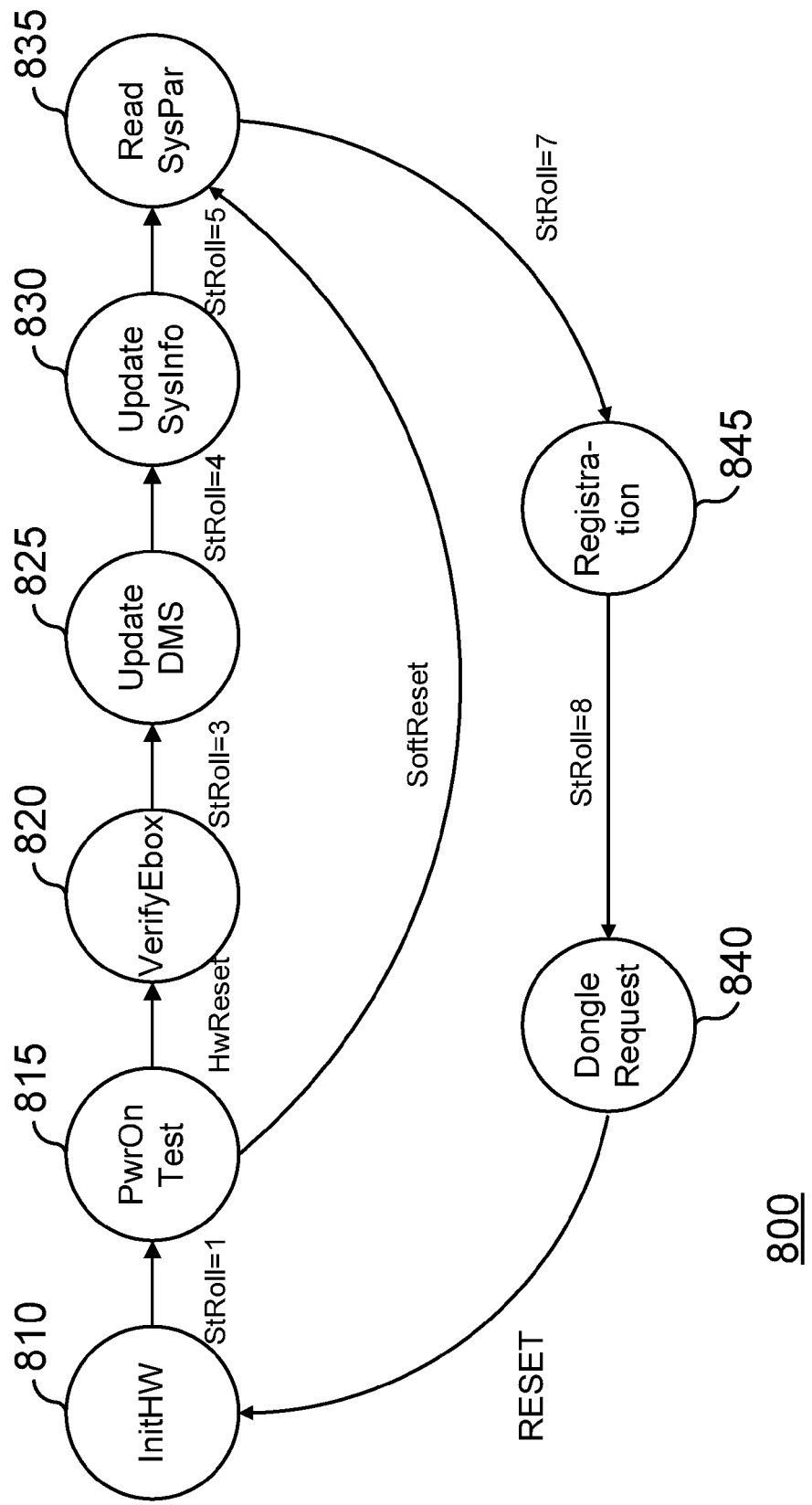
FIG. 6 is a state diagram for startup consistent with some embodiments.

FIG. 6 illustrates a simplified state diagram that may be executed on controller 520 for start up of a redox flow cell battery system. As shown in FIG. 6, controller 520 starts in the InitHW state 810 when a reset, such as a "soft" reset (i.e., restarting system without removing power) or "hard" reset (i.e., restarting system after power removed), occurs. A "hard" reset could occur, for example, after a system is shipped or replacement components installed during service. A "soft" reset could occur, for example, after a reset button is pushed.

During InitHW state 810, controller 520 may initialize electronic hardware and software. Signals may be sent on first link 525 by system components 560-570 of redox flow cell battery system 100 and received by controller 520. System information may, for example, be sent as a result of a reset and/or in response to signals sent by controller 520. Controller 520 may determine the presence or absence of system components 560-570. In some embodiments, controller 520 may determine if dongle 510 is present (e.g., connected to second link 515 and functioning) from signals on second link 515. For example, controller 520 may monitor signals on second link 515 to determine if dongle 510 is present. In some embodiments, second link 515 is an I$^2$C bus and dongle interface 215 includes an I$^2$C bus master. The presence of dongle 510 is determined while the I$^2$C bus master is initialized during InitHW state 810. If dongle 510 is not present, then controller 520 may issue a warning and/or cease operation of the system. A warning may, for example, be at least one of: a message on a display (e.g., "Dongle Missing" or error code); a sound; and a message sent to mobile device 535 and/or server 555. After electronic hardware and software within redox flow cell battery system 100 are initialized, controller transitions to PwrOnTest state 815.

Controller 520 determines whether a "soft" or "hard" reset occurred at PwrOnTest state 815. In some embodiments, controller 520 may read a soft register in main memory 645 which contains one of several predetermined values denoting different causes for system reset. In some embodiments, controller 520 may read a hard register in processor(s) 610-615 which stores a predetermined value when the processor undergoes a power cycle. In some embodiments, a predetermined value may be written into main memory 645 or special-purpose memory 655, and read by controller 520. When the system undergoes a soft reset, the predetermined value is read by controller 520. When the system undergoes a power ON/OFF cycle, the predetermined value is cleared and controller 520 reads a different value (e.g., all 0s or all 1s). When controller 520 determines the reset was a "soft" reset, then controller 520 may transition to ReadSysPar state 835. When controller 520 determines the reset was a "hard" reset, then controller 520 may transition to VerifyEbox state 820.

EBox Information in dongle 510 is verified in VerifyEbox state 820. For example, controller 520 may read and store Ebox Information in fixed storage 820 (e.g., RAM, ROM EPROM, EEPROM, and FLASH), along with date and time information. In some embodiments, fixed storage 820 includes at least one I$^2$C bus memory device. Controller 520 may compare Ebox Information stored in fixed storage 620 with Ebox Information stored in dongle 510. If Ebox Information stored in fixed storage 620 and in dongle 510 do not match, then Ebox Information in fixed storage 620 may be stored in dongle 510. Ebox Information may change, for example, when one Ebox is replaced with another in redox flow cell battery system 100. A history of Ebox Information sets may, for example, be one to one thousand sets long. In some embodiments, one hundred Ebox Information sets may be stored. The number of Ebox Information sets provides reliability information, because it indicates how many times the Ebox has been changed in redox flow battery system 100. In some embodiments, the number of Ebox Information changes may be used as an address offset to read System Information from dongle 510. Once VerifyEbox state 820 is complete, controller 520 transitions to UpdateDMS state 825.

Controller 520 may check whether dongle 510 contains Communication System Information in UpdateDMS state 825. When the dongle contains Communication System Information, then controller 520 may send Communication System Information to communications 660 and transition to UpdateSysInfo state 830. When the dongle does not contain Communication System Information (e.g., it is new), Communication System Information may be written to dongle 510. Controller 520 may wait for a commissioning program to write Communication System Information to dongle 510. A limit on how long controller 520 waits may be set and controller 520 may time out if this limit is exceeded. When controller 520 times out, a warning may be issued. A warning may, for example, be at least one of: a message on a display (e.g., "Communication System Info Missing" or error code); sound; and a message sent to mobile device 535 and/or server 555. After a warning is issued, controller 520 may proceed to UpdateSysInfo state 830.

Controller 520 may read System Information from dongle 510 in UpdateSysInfo state 830. In some embodiments, controller reads System Information and sends it to communications 660. For example, System Information can be received from a commissioning program where it is entered by a user or directly from components (e.g. over bus 640), and written to dongle 510. When dongle 510 does not contain System Information, then controller 520 issues a warning. A warning may, for example, be at least one of: a message on a display (e.g., "System Info Missing" or error code); a sound; and a message sent to mobile device 535 and/or server 555. Once UpdateSysInfo state 830 is complete, controller 520 transitions to ReadSysPar state 835.

Controller 520 may read System Parameters from dongle 510 in ReadSysPar state 835. In some embodiments, when certain System Parameters data (e.g., ESR value(s)) are not present, then default values may be used. In some embodiments, a register may record the number of ESR values stored in dongle 510. In some embodiments, a portion of dongle 510 may store information like a circular buffer with one-hundred locations for ESR values. In some embodiments, the most recent ESR value is read from dongle 510. Once ReadSysPar state 835 is complete, controller 520 transitions to Register state 845.

Figure 7:
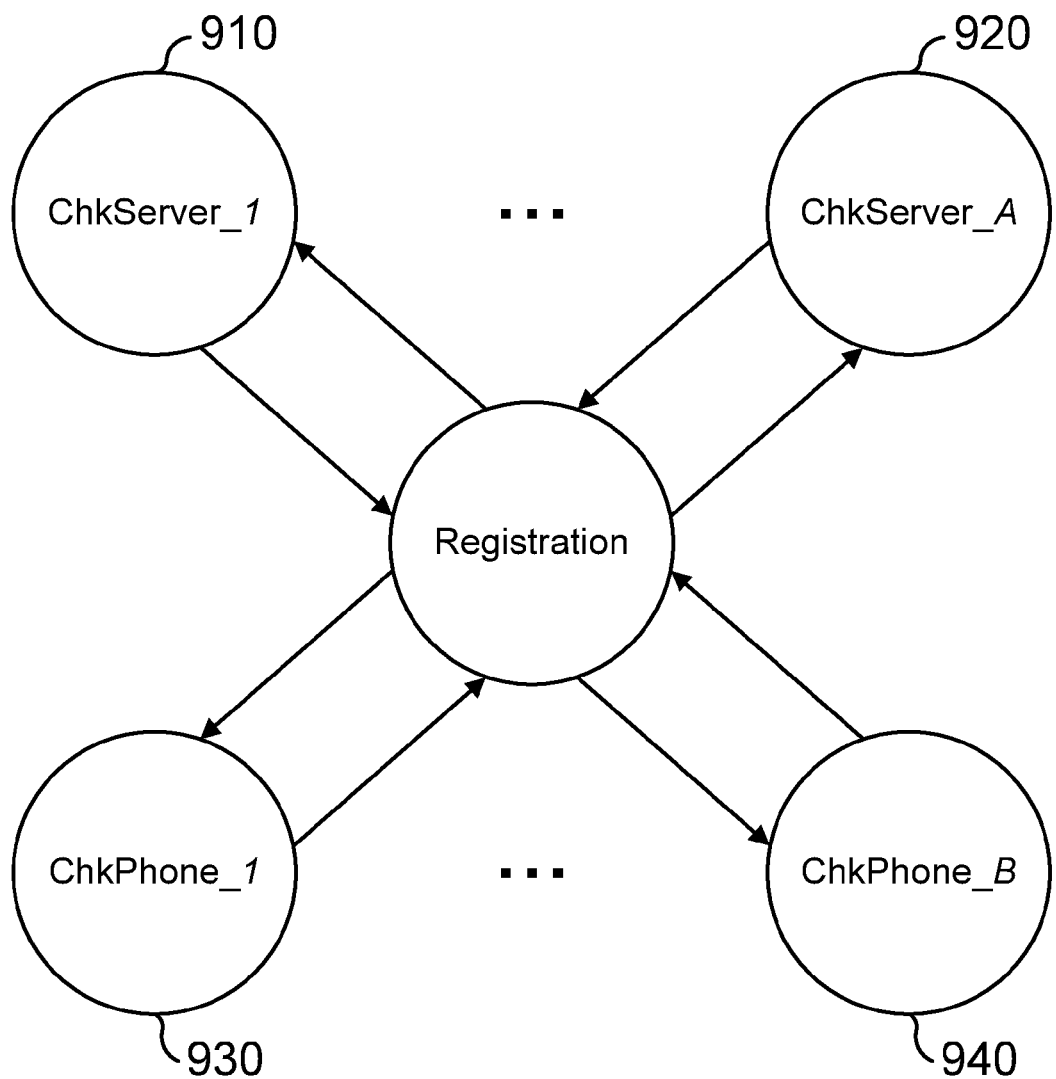
FIG. 7 is a state diagram illustrating the Register state of FIG. 6.

Controller 520 may read Communication System Information from dongle 510 in Registration state 845. FIG. 7 illustrates Registration state 845. Controller 520 may read an IP address and port number of one or more data servers 555 from dongle 510 in ChkServer states 910 and 920 and register with data server 555. Controller 520 may also read a telephone number from dongle 510 for communication SMS servers 555. In some embodiments of Registration state 845, controller 520 sends system identification (SysID) to data server 555 and can receive an acknowledgement from data server 555. In some embodiments, controller 520 can also send an SMS message including SysID to one or more SMS servers and can receive an acknowledgement from SMS server 555. Referring back to FIG. 6, after Registration state 845, controller 520 transitions to Dongle Request state 840

Controller 520 may write information to dongle 510 in Dongle Request state 840. In some embodiments, controller 520 may write System Parameters to dongle 510. For example, controller 520 may receive and collect operating data (electrolyte temperature, potential across battery electrodes, leak sensor data, level sensor data, rebalance cell voltage, rebalance cell current, thermistor voltage, etc). Using operating data, controller 520 may determine System Parameters (e.g., battery ESR, kWH data, number of cycles run, state of charge (SoC), imbalance information, battery open circuit voltage (OCV), etc.). Controller 520 may write System Parameters to dongle 510 and optionally date and time information.

In some embodiments, a time out for the write to dongle 510 is provided. For example, write information may be provided by an $I^2C$ master or a signal provided by a watch-dog timer. If the write to dongle 510 fails, then a warning can be issued. A warning can, for example, be at least one: of a message on a display (e.g., "Dongle write failure" or error code); sound; and message sent to mobile device 535 and/or server 555.

Controller 520 may read information from dongle 510 in Dongle Request state 840. In some embodiments, controller 520 may read one or more of: Ebox information; System Parameters; System Information; and Communication System Information from dongle 510. Controller 520 may read and write information to dongle 510 in Dongle Request state 840, until a reset occurs. After a reset, controller 520 transitions to the InitHW state 810.

Figure 8:
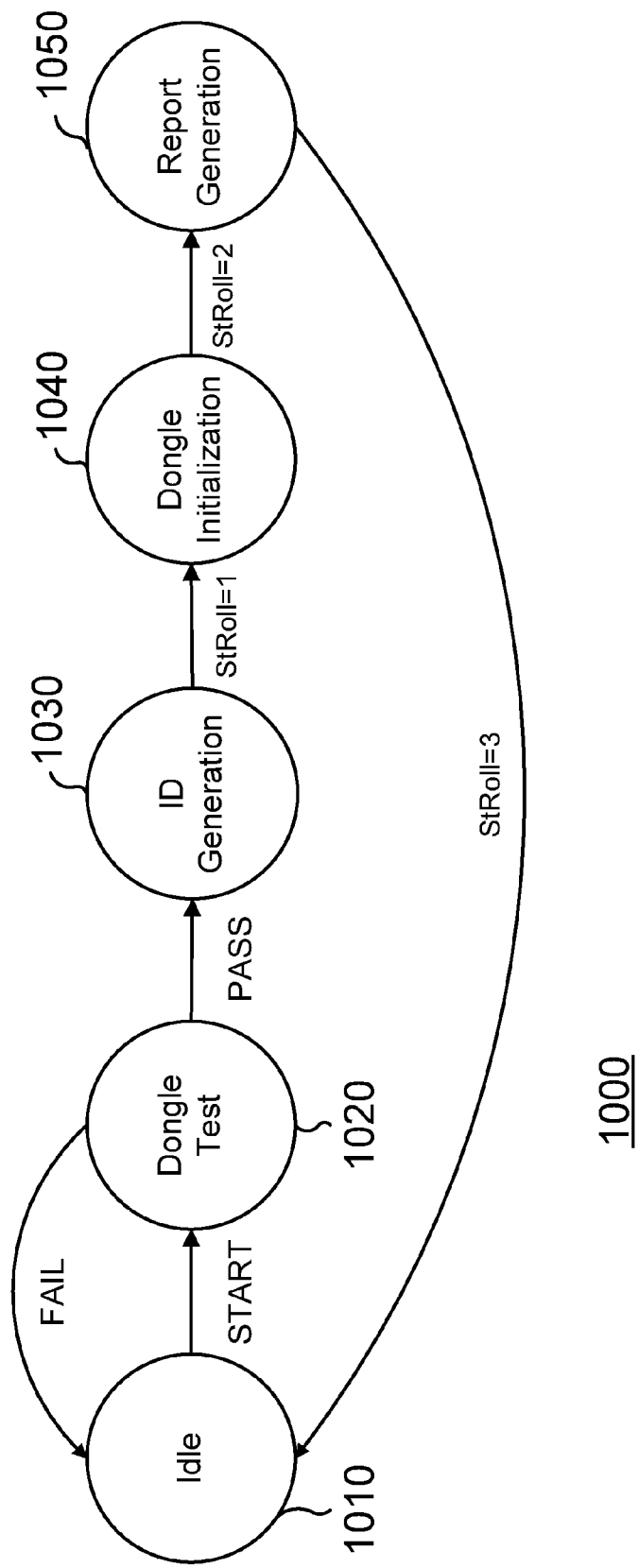
FIG. 8 is a state diagram for initialization according to some embodiments.

FIG. 8 illustrates a state diagram 1000 that may be executed on a digital system (e.g., desktop computer, notebook computer, embedded system, and the like) to initialize dongle 510 before it is installed in redox flow cell battery system 100. As shown in FIG. 8, digital system starts in Idle state 1010. Upon START, digital system transitions to Dongle Test state 1020. In Dongle Test state 1020, digital system may test dongle 510 hardware. In some embodiments, digital system may, for example, perform a handshake with dongle 510 over the bus (e.g., digital system may send the dongle's address and receive an acknowledgement from dongle 510); write to, read from, and verify test pattern(s) to memory locations or blocks of memory in dongle 510; and the like. When dongle 510 fails the dongle hardware test, digital system may indicate the failure (e.g., sounds, indicator lights, error message on display, in log file, etc.) and transitions to Idle state 1010. When dongle 510 passes hardware test, digital system transitions to ID Generation state 1030.

Digital system may receive or generate unique identification information, such as system identification (SysID) and/or dongle 510 identification in ID Generation state 1030. Digital system may write identification information to dongle 510. After identification information is written to dongle 510, digital system transitions to Dongle Initialization state 1040.

Digital system may receive default/predefined Communication System Information, System Parameters, and/or System Information in Dongle Initialization state 1040. Digital system may write default/predefined Communication System Information, System Information, and/or System Parameters to dongle 510 in Dongle Initialization state 1040. A date and/or time stamp (e.g., from digital system internal clock) may be written to dongle 510 in Dongle Initialization state 1040. After Communication System Information, System Information, and/or System Parameters are written to dongle 510, digital system transitions to Report Generation state 1050.

Digital system may generate a report in Report Generation state 1050. For example, for each dongle 510 initialized, digital system may write: one or more date and/or time stamps; results of dongle 510 hardware testing; identification information written to dongle 510; identification of the predefined Communication System Information; System Information; and/or System Parameters written to dongle 510, and the like. In some embodiments the report is in the form of a file (e.g., text, rich text format, spreadsheet, html, etc.) and sent to server 555. In some embodiments, a label containing SysID is generated and placed on dongle 510 to identify dongle 510. After the report is generated, digital system transitions to Idle state 1010.

Figure 9:
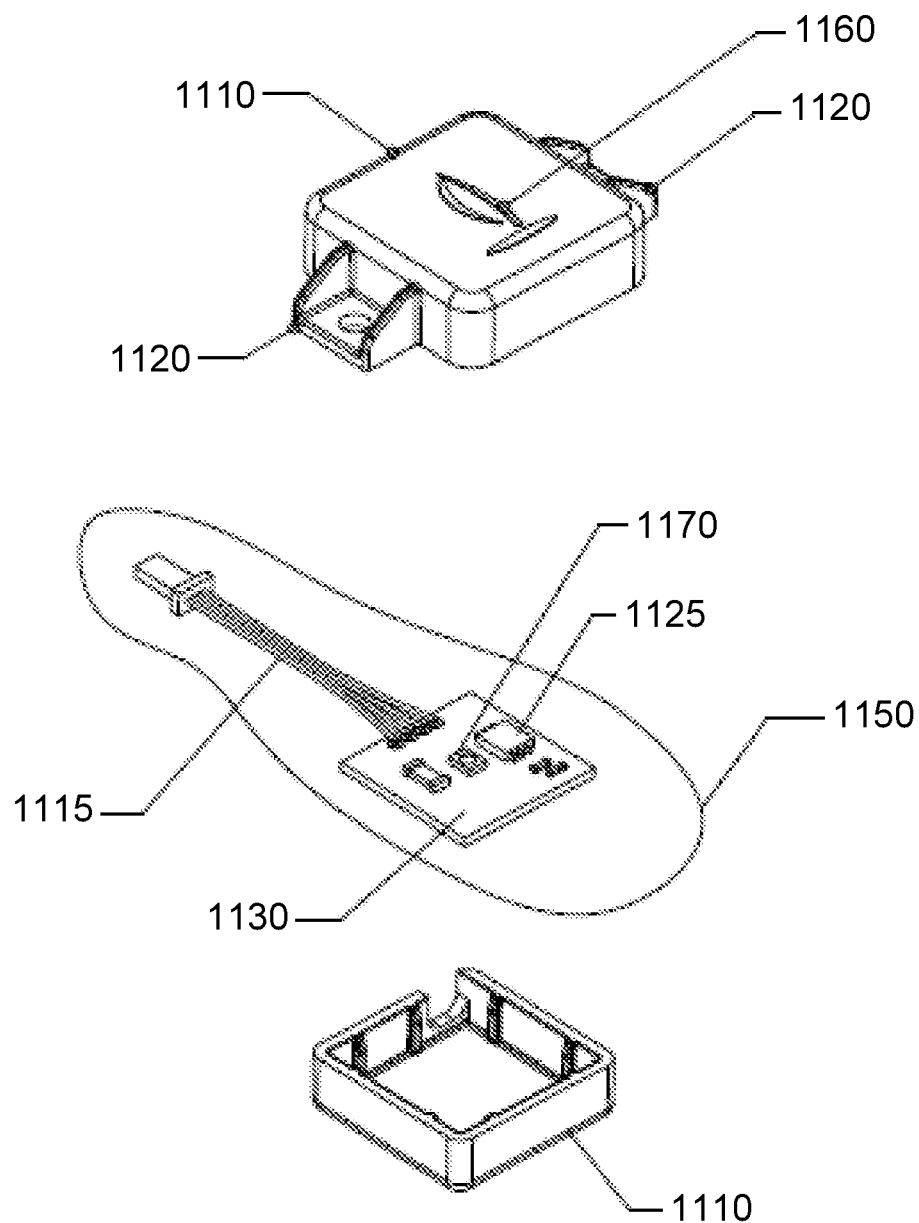
FIG. 9 illustrates views of a dongle consistent with some embodiments.

FIG. 9 illustrates an assembly for dongle 510 comprised of shell 1110 and electronics 1150. Dongle 510 includes shell 1110, which protects nonvolatile memory electronics 1150 from mechanical stress and exposure to the environment. Shell 1110 can be in one or more parts and include one or more mounting tabs 1120 which can be used for attachment to a redox flow battery system. Dongle 510 can include a physical interface 1115 which can be used for communication with controller 520 over second link 515. Alternative embodiments may include: different tabs, indentations, and surfaces to accommodate various straps, clips, fasteners, ties, tape, adhesives, etc. which can be used for attaching dongle 510 to a redox flow battery system; different physical connectors, plugs, receptacles, electrically conductive surfaces, etc. which can be used to accommodate electrical connection and communication with a controller; and different shell shapes and sizes which can facilitate incorporation of the nonvolatile memory physically and aesthetically into a redox flow battery system. In some embodiments, dongle 510 can be potted (e.g., with 3M DP8010) to protect electronics 1150 from adverse environmental conditions (e.g., moisture, corrosion, etc.); and dongle 510 can have a cutout 1160 (e.g., in the shape of a logo or other identifying mark) etched on shell 1110 through which an illumination source 1170 (e.g., light emitting diode (LED), incandescent light bulb, etc.) can shine.

FIG. 9 also illustrates electronics 1150 housed within shell 1110. Electronics 1150 may include nonvolatile memory device 1125, physical interface 1115, illumination source 1170, and substrate 1130. The nonvolatile memory device 1125, for example, can be one or more integrated circuits containing memory (e.g., FLASH), and interface logic and transceiver for communication with the control system through second link 515. Nonvolatile memory device 1125 can be one or more semiconductor die, one or more packaged integrated circuits, a multi-chip module, a chip stack, and the like. In some embodiments, second link 1115 can be an $I^2C$ bus. Substrate 1130 can be a printed circuit board, high density interconnection (HDI) substrate, and the like. Physical interface 1115 can be formed from substrate 1130 or be one or more separate cables, plugs, receptacles, connectors, contact pads, and the like electrically connected to the nonvolatile memory device 1125.

Dongle 510 may contain a local history of the redox flow cell battery system 100, because in exemplary embodiments, dongle 510 may: be located with the redox flow cell battery system 100; store at least one of Ebox Information, System Parameters, System Information, and Communication System Information in a data structure; and be written to, be read from, and store the data in a circular buffer by controller 520. Moreover, dongle 510 may stay with redox flow cell battery system 100, because dongle 510 may be housed in a separate shell which is attached to the redox flow cell battery system. As such, dongle 510 is not typically removed like system components which are removed (e.g., for maintenance). Such a local history may be advantageously accessed and analyzed by mobile device 535 and/or server 555 to diagnose problems, predict failures, and perform other maintenance functions.

Should a first of dongle 510 fail, it may be replaced by a second of dongle 510, and information in the first of dongle 510 transferred to the second of dongle 510. Since dongle 510 stores operational statistics, removal and replacement of power and/or processor boards and other parts of redox flow cell battery system 100 do not affect performance of the redox flow cell battery system 100. Moreover, storage of changing operational statistics in dongle 510 may enable redox flow cell battery system 100 to adapt to changing circumstances without changes to firmware 650.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of operating a flow cell battery system, the method comprising:
   monitoring and controlling a flow cell battery during use, the flow cell battery comprising:
      a controller;
      at least one flow cell;
      at least one tank containing an electrolyte composition, the at least one tank being coupled to the at least one flow cell; and
   sending the electrolyte composition from the tank to the flow cell during charging and discharging of the flow cell battery;
   recording operating parameters of the flow cell battery to a separate dongle coupled to the flow cell battery system during charging and discharging of the flow cell battery;
   initializing the flow cell battery based on information stored in the dongle when one or more components of the flow cell battery are replaced; and
   resuming operation of the flow cell battery, wherein the flow cell battery is operated according to the operating parameters recorded in the dongle.

2. The method of claim 1, wherein the dongle is removably coupled to the flow cell battery system.

3. The method of claim 1, wherein the dongle remains coupled to the flow cell battery system during replacement of the one or more components of the flow cell battery.

4. The method of claim 1, further comprising recording identification information of components of the one or more of the components of the flow cell battery on the dongle.

5. The method of claim 4, wherein initialization of the flow cell battery occurs when identification information of the one or more components is different from the component identification information stored on the dongle.

6. The method of claim 1, further comprising recording communication information of the flow cell battery system on the dongle, wherein the communication system comprises identifiers used for communication of data between the flow cell battery system and one or more external servers.

7. The method of claim 1, wherein the dongle is comprised of a non-volatile memory, housing, connector, and potting material.

8. The method of claim 2, wherein the information stored in the dongle is encrypted.

9. The method of claim 1, further comprising initializing the dongle prior to coupling the dongle to the flow cell battery, wherein initialization of the dongle comprises writing default operating parameters to the dongle.

* * * * *